United States Patent [19]

Wilding et al.

[11] Patent Number: 5,304,487
[45] Date of Patent: Apr. 19, 1994

[54] FLUID HANDLING IN MESOSCALE ANALYTICAL DEVICES

[75] Inventors: Peter Wilding, Paoli; Larry J. Kricka, Berwyn; Jay N. Zemel, Jenkintown, all of Pa.

[73] Assignee: Trustees of the University of Pennsylvania, Philadelphia, Pa.

[21] Appl. No.: 877,536

[22] Filed: May 1, 1992

[51] Int. Cl.⁵ .................................. G01N 31/00
[52] U.S. Cl. .................. 435/291; 422/55; 422/58; 422/61; 435/7.2; 435/7.21; 436/164; 436/524; 436/809
[58] Field of Search .................. 422/55, 58, 61; 436/524, 164, 807, 809, 49, 501, 180; 435/2, 7.21, 359, 291, 6, 7.2

[56] References Cited

U.S. PATENT DOCUMENTS

| | | | |
|---|---|---|---|
| 3,799,742 | 3/1974 | Coleman | 422/61 |
| 3,906,929 | 9/1975 | Augspurger | 435/2 |
| 4,233,029 | 11/1980 | Columbus | 422/55 |
| 4,302,313 | 11/1981 | Columbus | 422/68 |
| 4,350,768 | 9/1982 | Tihon et al. | 435/2 |
| 4,618,476 | 10/1986 | Columbus | 422/100 |
| 4,676,274 | 6/1987 | Brown | 422/82 |
| 4,790,640 | 12/1988 | Nason | 350/534 |
| 4,886,761 | 12/1989 | Gustafson et al. | 436/518 |
| 4,906,439 | 3/1990 | Grenner | 422/56 |
| 4,908,112 | 3/1990 | Pace | 204/299 R |
| 4,911,782 | 3/1990 | Brown | 156/633 |
| 4,963,498 | 10/1990 | Hillman et al. | 436/69 |
| 4,999,283 | 3/1991 | Zavos et al. | 435/2 |
| 5,114,858 | 5/1992 | Williams et al. | 435/259 |
| 5,135,720 | 8/1992 | Uchida | 422/69 |
| 5,147,606 | 9/1992 | Charlton et al. | 422/56 |

FOREIGN PATENT DOCUMENTS

| | | |
|---|---|---|
| 0320308 | 6/1989 | European Pat. Off. . |
| 0439182 | 7/1991 | European Pat. Off. . |
| 0483117 | 4/1992 | European Pat. Off. . |
| 3915920 | 11/1990 | Fed. Rep. of Germany . |
| 4028771 | 2/1991 | Fed. Rep. of Germany . |
| 90/09596 | 8/1990 | PCT Int'l Appl. . |
| 91/15750 | 10/1991 | PCT Int'l Appl. . |
| 91/16966 | 11/1991 | PCT Int'l Appl. . |
| 2131972 | 7/1984 | United Kingdom . |
| 2191110 | 12/1987 | United Kingdom . |

OTHER PUBLICATIONS

Kinosita et al. "Dual-view microscopy with a single camera"; J. Cell Biol.; 115(1), 67–73; Oct. 1991 (Abstract).
Schnaitman, C; "Cell fractionation"; Manual of methods for general bacteriology; 1981; 52–55,61. American Society of Microbiology.
Anderson, Nature, 355:379 (1992).
Angell, etal., Scientific American, 248:44–55 (1983).
Appenzeller, Science, 254:1300–1342 (1991).
Barany, Proc. Natl. Acad. Sci, 88:189–192 (1991).

(List continued on next page.)

Primary Examiner—James C. Housel
Assistant Examiner—Ramon Torres
Attorney, Agent, or Firm—Testa, Hurwitz & Thibeault

[57] ABSTRACT

Devices are provided for analyzing a fluid cell containing sample. The devices comprise a solid substrate, microfabricated to define at least one sample inlet port and a mesoscale flow system. The mesoscale flow system includes a sample flow channel, extending from the inlet port, and a cell handling region for treating cells disposed in fluid communication with the flow channel. The devices may further include a structure inducing flow of cells in the sample through the flow system. In one embodiment, the cell-handling region may comprise a cell lysis structure to enable the lysis of cells in the sample, prior to, e.g., the detection of an intracellular component in the cell sample. In another embodiment, the cell handling region may comprise a cell capture region, comprising binding sites which reversibly bind to a specific population of cells in the cell sample, to permit the isolation of the specific cell population from the sample. The devices can be utilized in a wide range of automated sensitive and rapid tests for the analysis of a fluid cell containing sample.

26 Claims, 7 Drawing Sheets

OTHER PUBLICATIONS

Brown, "Development of a Stopped-Flow Cytometer," NSF Grant No. ISI 87-60730.
Brunette, *Exper. Cell Res.*, 167: 203-217 (1986).
Brunette, *Exper. Cell Res.*, 164: 11-26 (1986).
Columbus et al., *Clin. Chem.*, 33:1531-1537 (1987).
DeLuca et al., *Arch. Biochem. Biophys.*, 255:285-292 (1983).
Dessy, *Chemometrics and Intelligent Laboratory Systems*, 8:311 (1990), Abstract.
Esashi et al., "Integrated Flow Control Systems Fabricated on a Silicon Wafer," Proceedings, Electrochemical Society Conference, HI (Oct. 18-23, 1987) Electrochemical Society, Pennington, N.J., pp. 31-38B, 1987.
Fromherz et al., *Biochimica et Biophysica Acta*, 1062:103-107 (1991).
Goin et al., *Clin. Chem.*, 32:1655-1659 (1986).
Haller in: *Solid Phase Biochemistry*, W. H. Scouten, Ed., John Wiley, New York, pp. 535-597 (1983).
Hanazato et al., *IEEE Transactions Electron Devices; ED33*:47-51, (1986).
Hoopman, "Microchanneled Structures," Applied Technology Laboratory, 3M Center, St. Paul, MN 55144-1000.
Howe et al., *IEEE Transactions Electron Devices, ED33*:499-506 (1986).
Hung et al, *Med. & Biol. Engng.*, 9:237-245 (1971).
Jonsson, *Methods in Enzymology*, 137:381-389 (1988).
Kennedy et al., *Clin. Chem. Acta.*, 70:1-31 (1976).
Kenny et al., *Appl. Phys. Lett.*, 58:100-102 (1991).
Kikuchi et al., "Microchannels Made on Silicon Wafer for Measurement of Flow Properties of Blood Cells," *Biorheology*, 26:1055 (1989), Abstract.
Kittilsland et al., *Journal de Physique*, 49 (C4)641-644 (1988).
Kittilsland et al., *Sensors and Activators*, A21-A23:9-04-907 (1990).
Kricka et al., "Liquid Transport in Micron and Submicron Channels," *SPIE*, 1167:159-168 (1989).
Kricka et al., *Clin. Chem.*, 26:741-744 (1980).
LaCelle, *Blood Cells*, 112:179-189 (1986).
Mandenius et al., *Anal. Biochem.*, 137:106-114 (1984).
Mandenius et al., *Anal. Biochem.*, 170:68-72 (1988).
Mandenius et al., *Methods in Enzymology*, 137:388-394 (1988).
Manz et al., *Trends in Anal. Chem.*, 10:144-149 (1991).
Masuda et al. Proc. *IEEE/IAS Meeting*, pp. 1549-1553 (1987).
McCartney et al., *Cancer Res.*, 41:3046-3051 (1981).
Moghissi et al., *Am. J. Obstet, Gynecol.*, 114:405-(1972).
Nakamura, *Immunochemical Assays and Biosensor Technology for the 1990's*, American Society of Microbiology, Washington, D.C., pp. 205-215 (1992).
Nakamura et al., *Anal. Chem.*, 63:268-272 (1991).
Parce et al., *Science*, 24:243-247 (1989).
Rosenberg et al., *Clin. Chem.*, 30:1462-1466 (1984).
Rosenberg et al., *Clin. Chem.*, 31:1444-1448 (1985).
Sankolli et al., *J. Immun. Methods*, 104:191-194 (1987).
Sato, et al., *Sensors and Actuators*, A21-A23:948-951 (1990).
Shoji, et al., *Sensors and Actuators*, 15:101-107 (1988).
Stange et al., *Biomaterials*, 9:3-6 (1988).
Van Lintel, *Sensors and Actuators*, 15:153-167 (1988).
Wallis et al., *J. Amer. Ceramic Soc.*, 53;563-567 (1970).
Washizu et al., *Proceedings IEEE/IAS Meeting*, pp. 1735-1740 (1988).
Weissman et al., *Am. Inst. Chem. Eng. J.*, 17:25-30 (1971).
Zemel et al. in: *Fundamentals and Applications of Chemical Sensors*, D. Schuetzle and R. Hammerle, Eds., *ACS Symposium Series 309*, Washington, D.C., 1986, p. 2.
Biotrack, Ciba Corning, May, 1989.
Wilding, *Advanced Hospital Technology Laboratory*, Oct., 1990 pp. 38-42.
Roche, On-Trak TM, Sep., 1988.
Pfahler et al., "Liquid Transport in Micron and Submicron Channels," *Sensors and Actuators*, A21-23:431-434 (1990).
Tracey, et al., "Microfabricated Microhaemorheometer," *IEEE International Conference on Solid-State Sensors and Actuators*, pp. 82-84 (1991).
Washizu, et al., "Handling of Biological Cells Using Fluid Integrated Circuit," *IEEE Industry Applications Society Annual Meeting*, 2:1735-1740 (1988).

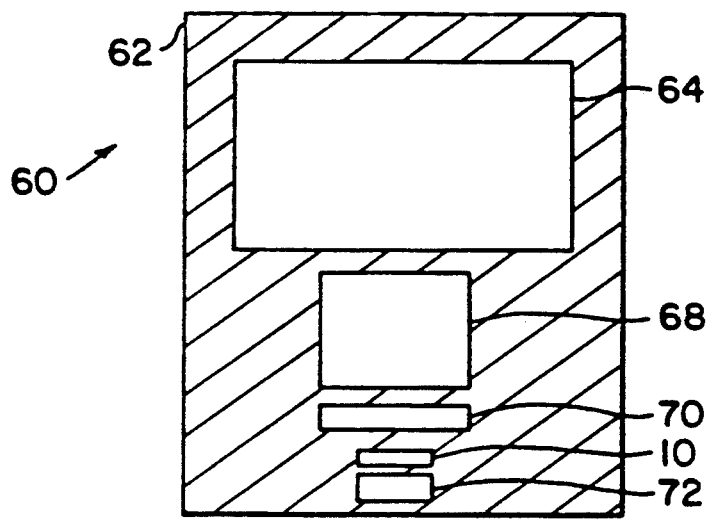
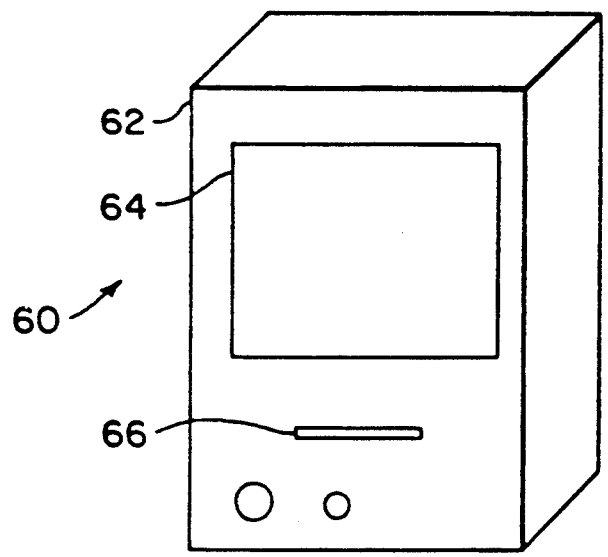

FLUID HANDLING IN MESOSCALE ANALYTICAL DEVICES

REFERENCE TO RELATED APPLICATIONS

This application is being filed contemporaneously with the following related copending applications: U.S. Ser. No. 07/877,702 filed May 1, 1992, U.S. Ser. No. 07/877,701 filed May 1, 1992; U.S. Ser. No. 07/877,662 filed May 1, 1992 and U.S. Ser. No. 07/877,661, filed May 1, 1992, the disclosures of which are incorporated herein by reference.

BACKGROUND OF THE INVENTION

This invention relates generally to methods and apparatus for conducting analyses. More particularly, the invention relates to the design and construction of small, typically single-use, modules capable of analyzing a fluid sample.

In recent decades the art has developed a very large number of protocols, test kits, and cartridges for conducting analyses on biological samples for various diagnostic and monitoring purposes. Immunoassays, agglutination assays, and analyses based on polymerase chain reaction, various ligand-receptor interactions, and differential migration of species in a complex sample all have been used to determine the presence or concentration of various biological compounds or contaminants, or the presence of particular cell types.

Recently, small, disposable devices have been developed for handling biological samples and for conducting certain clinical tests. Shoji et al. reported the use of a miniature blood gas analyzer fabricated on a silicon wafer. Shoji et al., *Sensors and Actuators*, 15:101–107 (1988). Sato et al. reported a cell fusion technique using micromechanical silicon devices. Sato et al., *Sensors and Actuators*, A21–A23:948–953 (1990). Ciba Corning Diagnostics Corp. (USA) has manufactured a microprocessor-controlled laser photometer for detecting blood clotting.

Micromachining technology originated in the microelectronics industry. Angell et al., *Scientific American*, 248:44–55 (1983). Micromachining technology has enabled the manufacture of microengineered devices having structural elements with minimal dimensions ranging from tens of microns (the dimensions of biological cells) to nanometers (the dimensions of some biological macromolecules). This scale is referred to herein as "mesoscale". Most experiments involving mesoscale structures have involved studies of micromechanics, i.e., mechanical motion and flow properties. The potential capability of mesoscale structures has not been exploited fully in the life sciences.

Brunette (*Exper. Cell Res.*, 167:203–217 (1986) and 164:11–26 (1986)) studied the behavior of fibroblasts and epithelial cells in grooves in silicon, titanium-coated polymers and the like. McCartney et al. (*Cancer Res.*, 41:3046–3051 (1981)) examined the behavior of tumor cells in grooved plastic substrates. LaCelle (*Blood Cells*, 12:179–189 (1986)) studied leukocyte and erythrocyte flow in microcapillaries to gain insight into microcirculation. Hung and Weissman reported a study of fluid dynamics in micromachined channels, but did not produce data associated with an analytic device. Hung et al., *Med. and Biol. Engineering*, 9:237–245 (1971); and Weissman et al., *Am. Inst. Chem. Eng. J.*, 17:25–30 (1971). Columbus et al. utilized a sandwich composed of two orthogonally orientated v-grooved embossed sheets in the control of capillary flow of biological fluids to discrete ion-selective electrodes in an experimental multi-channel test device. Columbus et al., *Clin. Chem.*, 33:1531–1537 (1987). Masuda et al. and Washizu et al. have reported the use of a fluid flow chamber for the manipulation of cells (e.g. cell fusion). Masuda et al., *Proceedings IEEE/IAS Meeting*, pp. 1549–1553 (1987); and Washizu et al., *Proceedings IEEE/IAS Meeting* pp. 1735–1740 (1988). The art has not fully explored the potential of using mesoscale devices for the analyses of biological fluids and detection of microorganisms.

The current analytical techniques utilized for the detection of microorganisms are rarely automated, usually require incubation in a suitable medium to increase the number of organisms, and invariably employ visual and/or chemical methods to identify the strain or subspecies. The inherent delay in such methods frequently necessitates medical intervention prior to definitive identification of the nature of an infection. In industrial, public health or clinical environments, such delays may have serious consequences. There is a need for convenient systems for the rapid detection of microorganisms.

An object of the invention is to provide analytical systems with optimal reaction environments that can analyze microvolumes of sample, detect substances present in very low concentrations, and produce analytical results rapidly. Another object is to provide easily mass produced, disposable, small (e.g., less than 1 cc in volume) devices having mesoscale functional elements capable of rapid, automated analyses in a range of biological and other applications. It is a further object of the invention to provide a family of such devices that individually can be used to implement a range of rapid clinical tests, e.g., tests for bacterial contamination, virus infection, sperm motility, blood parameters, contaminants in food, water, or body fluids, and the like.

SUMMARY OF THE INVENTION

The invention provides methods and devices for the analysis of a fluid sample. The device comprises a solid substrate, typically on the order of a few millimeters thick and approximately 0.2 to 2.0 centimeters square, micro-fabricated to define a sample inlet port and a mesoscale flow system. The mesoscale flow system includes a sample flow channel, extending from the inlet port, and a fluid handling region, in fluid communication with the flow channel. The term "mesoscale" is used herein to define chambers and flow passages having cross-sectional dimensions on the order of 0.1 $\mu$m to 500 $\mu$m. The mesoscale flow channels and fluid handling regions have preferred depths on the order of 0.1 $\mu$m to 100 $\mu$m, typically 2–50 $\mu$m. The channels have preferred widths on the order of 2.0 to 500 $\mu$m, more preferably 3–100 $\mu$m. For many applications, channels of 5–50 $\mu$m widths will be useful. Chambers in the substrates often will have larger dimensions, e.g., a few millimeters.

In one embodiment, the device may be utilized to analyze a cell containing fluid sample, and the fluid handling region may comprise a cell handling region. The device may further include means for inducing flow of cells in the sample through the mesoscale flow system. The cell handling region may comprise a cell lysis means. The flow inducing means may be utilized to force a cell sample through the cell lysis means to rupture the cells. Means may also be provided in the device for detecting the presence of an intracellular molecular component of a cell in the cell sample. The cell lysis means may comprise, e.g., sharp-edged pieces of silicon trapped within the cell handling region, or cell membrane piercing protrusions extending from a wall of the cell handling region of the mesoscale flow system. Alternatively, a region of reduced cross-sectional area may comprise the cell lysis means. The flow system may further comprise a microfabricated filter for, e.g., filtering cellular debris from the sample, prior to analysis for the presence of an intracellular analyte.

The cell handling region may also comprise a cell capture region comprising binding sites capable of reversibly binding a cell surface molecule to enable the selective isolation of a cell population from a cell sample. Means may also be provided downstream of the cell capture region for determining the presence of a cell or cell surface molecule in the sample. In another embodiment, the cell handling region may comprise an inert barrier, such as posts extending from a wall of the region, to enable the sorting of cells by size. The posts also may comprise, e.g., a barrier to the flow of a sperm sample, to enable the assessment of sperm motility.

Generally, as disclosed herein, the solid substrate comprises a chip containing the mesoscale flow system. The mesoscale flow system may be designed and fabricated from silicon and other solid substrates using established micromachining methods. The mesoscale flow systems in the devices may be constructed by microfabricating flow channels and one or more fluid handling regions into the surface of the substrate, and then adhering a cover, e.g., a transparent glass cover, over the surface. The devices typically are designed on a scale suitable to analyze microvolumes ($<10$ $\mu L$) of sample, introduced into the flow system through an inlet port defined, e.g., by a hole communicating with the flow system through the substrate or the cover. The volume of the mesoscale flow system typically will be $<5$ $\mu m$, and the volume of individual channels, chambers, or other functional elements are often less than 1 $\mu m$, e.g., in the nL or pL range. Cells or other components present in very low concentrations (e.g., nanogram quantities) in microvolumes of a sample fluid can be rapidly analyzed (e.g., $<10$ minutes).

The chips typically will be used with an appliance which contains a nesting site for holding the chip, and which mates one or more input ports on the chip with one or more flow lines in the appliance. After a fluid sample, e.g., a cell-containing fluid sample, suspected to contain a particular cell type, or molecular component, is applied to the inlet port of the substrate, the chip is placed in the appliance, and a pump, e.g., in the appliance, is actuated to force the sample through the flow system. Alternatively, a sample may be injected into the chip by the appliance. The sample also may enter the flow system by capillary action.

In one embodiment, the fluid handling chamber of the device may include a mesoscale detection region, downstream from the fluid handling region, for detecting the presence of an analyte in the fluid sample such as a cellular, intracellular, or other fluid sample component. The detection region may be constructed in accordance with U.S. Ser. No. 07/877,702 filed May 1, 1992, the disclosure of which is incorporated herein by reference. The appliance may be designed to receive electronic or spectrophotometric signals in the detection region, to indicate the presence of the preselected component in the cell sample. The presence of a cellular, intracellular or other analyte in the detection region may also be detected optically, e.g., through a transparent or translucent window, such as a transparent cover, over the detection region, or through a translucent section of the substrate itself. The appliance may include sensing equipment such as a spectrophotometer, capable of detecting the presence of a preselected analyte in the detection region. In one embodiment, the detection region may comprise binding moieties, capable of binding to the analyte to be detected, thereby to enhance and facilitate detection. The detection region also may comprise a fractal region, i.e., a region of serially bifurcating flow channels, sensitive to changes in flow properties of a fluid sample, as is disclosed in U.S. Ser. No. 07/877,701, filed May 1, 1992, the disclosure of which is incorporated herein by reference. The device also may be fabricated with at least three inlet ports, in fluid communication with the flow system, provided with valves, e.g., in an appliance used in combination with the device, for closing and opening the ports to enable the control of fluid flow through the mesoscale flow system.

The mesoscale devices can be adapted to perform a wide range of biological tests. Some of the features and benefits of the devices are summarized in Table 1. A device may include two or more separated flow systems, e.g., fed by a common inlet port, with different cell handling chambers in each of the systems to enable two or more analyses to be conducted simultaneously. The devices can be utilized to implement a range of rapid tests, e.g., to detect the presence of a cellular or intracellular component of a fluid sample. The devices may be utilized to detect, e.g., a pathogenic bacteria or virus, or for cell sorting. The invention provides methods and devices for a wide range of possible analysis. Assays may be completed rapidly, and at the conclusion of the assay the chip can be discarded, which advantageously prevents contamination between samples, entombs potentially hazardous materials, and provides inexpensive, microsample analyses.

TABLE 1

| Feature | Benefit |
| --- | --- |
| Flexibility | No limits to the number of chip designs or applications available. |
| Reproducible | Allows reliable, standardized, mass production of chips. |
| Low Cost Production | Allows competitive pricing with existing systems. Disposable nature for single-use processes. |
| Small Size | No bulky instrumentation required. Lends itself to portable units and systems designed for use in non-conventional lab environments. Minimal storage and shipping costs. |
| Microscale | Minimal sample and reagent volumes required. Reduces reagent costs, especially for more expensive, specialized test procedures. Allows simplified instrumentation schemes. |
| Sterility | Chips can be sterilized for use in microbiological assays and other procedures requiring clean environments. |
| Sealed System | Minimizes biohazards. Ensures process integrity. |
| Multiple Circuit Capabilities | Can perform multiple processes or analyses on a single chip. Allows panel assays. |
| Multiple Detector Capabilities | Expands capabilities for assay and process monitoring to virtually any system. Allows broad range of applications. |
| Reuseable Chips | Reduces per process cost to the user |

TABLE 1-continued

| Feature | Benefit |
|---|---|
| | for certain applications. |

BRIEF DESCRIPTION OF THE DRAWINGS

FIGS. 11 is schematic perspective view of an apparatus 60 used in combination with device 10 for viewing the contents of device 10.

FIG. 12 is a schematic cross sectional view of the apparatus 60 of FIG. 11.

Like reference characters in the respective drawn figures indicate corresponding parts.

DETAILED DESCRIPTION

Figure 1:
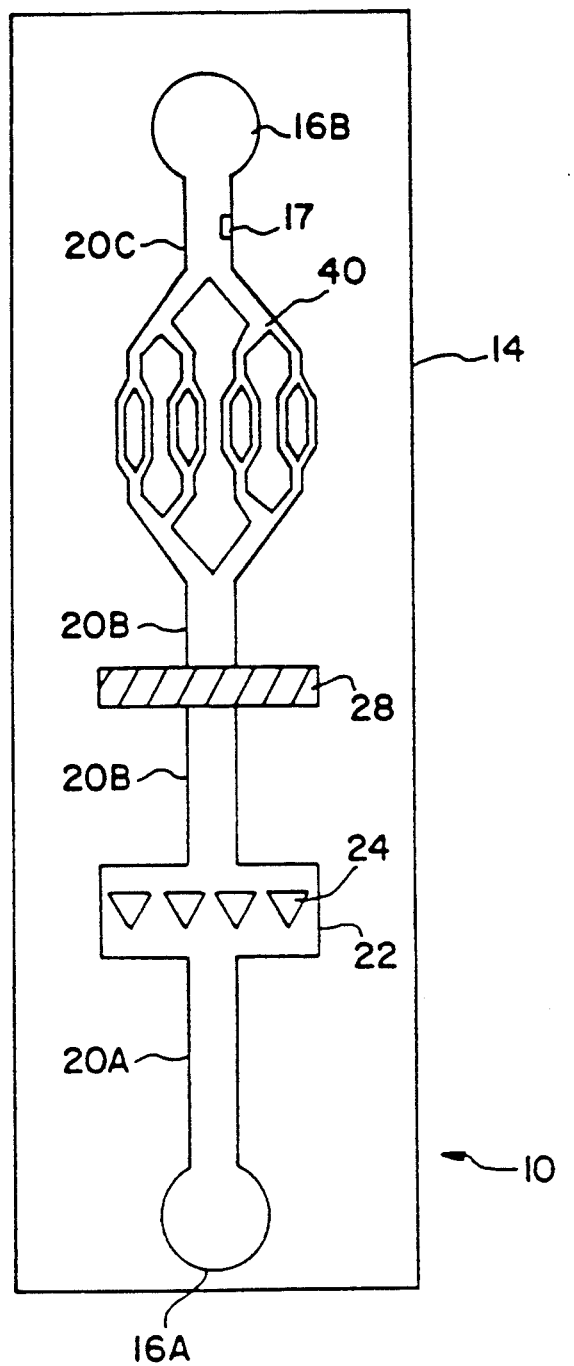
FIG. 1 is a magnified plan view of a device according to the invention that includes a solid substrate 14, on which are machined entry ports 16, mesoscale flow channel 20, cell lysis chamber 22, and fractal region 40, with a transparent cover 12 adhered to the surface of the substrate.

The invention provides methods and apparatus for the analysis of a fluid sample. The device comprises a solid substrate, microfabricated to define a sample inlet port and a mesoscale flow system. The mesoscale flow system comprises a sample flow channel extending from the inlet port, and a fluid handling region in fluid communication with the flow channel. In one embodiment, the devices may be utilized to analyse a cell-containing fluid sample. The devices may be used, e.g., to detect the presence of a cellular or intracellular component in a cell sample.

Analytical devices having mesoscale flow channels and cell handling chambers can be designed and fabricated in large quantities from a solid substrate material. They can be sterilized easily. Silicon is a preferred substrate material because of the well-developed technology permitting its precise and efficient fabrication, but other materials may be used, including polymers such as polytetrafluoroethylenes. The sample inlet port and other ports, the mesoscale flow system, including the sample flow channel(s) and the fluid handling region(s), and other functional elements, may be fabricated inexpensively in large quantities from a silicon substrate by any of a variety of micromachining methods known to those skilled in the art. The micromachining methods available include film deposition processes such as spin coating and chemical vapor deposition, laser fabrication or photolithographic techniques such as UV or X-ray processes, or etching methods which may be performed by either wet chemical processes or plasma processes. (See, e.g., Manz et al., *Trends in Analytical Chemistry* 10: 144-149 (1991)).

Flow channels of varying widths and depths can be fabricated with mesoscale dimensions. The silicon substrate containing a fabricated mesoscale flow channel may be covered and sealed with a thin anodically bonded glass cover. Other clear or opaque cover materials may be used. Alternatively, two silicon substrates can be sandwiched, or a silicon substrate can be sandwiched between two glass covers. The use of a transparent cover results in a window which facilitates dynamic viewing of the channel contents, and allows optical probing of the mesoscale flow system either visually or by machine. Other fabrication approaches may be used.

The capacity of the devices is very small, and therefore the amount of sample fluid required for an analysis is low. For example, in a 1 cm $\times$ 1 cm silicon substrate, having on its surface an array of 500 grooves which are 10 microns wide $\times$ 10 microns deep $\times$ 1 cm ($10^4$ microns) long, the volume of each groove is $10^{-3}$ $\mu$L and the total volume of the 500 grooves is 0.5 $\mu$L. The low volume of the mesoscale flow systems allows assays to be performed on very small amounts of a liquid sample ($<5$ $\mu$l). The mesoscal flow system of the devices may be microfabricated with microliter volumes or alternatively nanoliter volumes or less, which advantageously limits the amount of sample and/or reagent fluids required for the assay. In one embodiment, electron micrographs of biological structures such as circulatory networks may be used as masks for fabricating mesoscale flow systems on the substrate. Mesoscale flow systems may be fabricated in a range of sizes and conformations.

Figure 6:
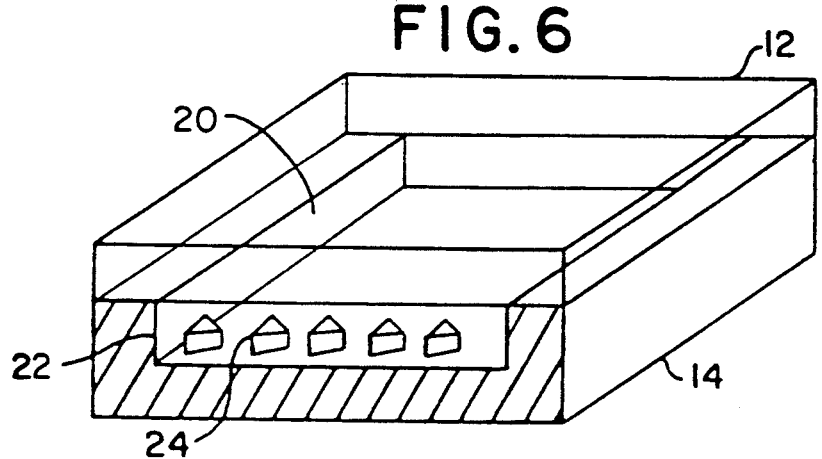
FIG. 6 is a cross sectional view of a fluid handling region 22 on the inert substrate 14 with cell piercing protrusions 24 extending from the wall of the channel.

In one embodiment, the devices may be utilized to analyze a cell-containing fluid sample. The fluid handling region may comprise, in one embodiment, a cell lysing means, to allow cells in a fluid sample to be lysed prior to analysis for an intracellular molecule such as an mRNA or DNA molecule. As illustrated in FIG. 6, the cell lysing means may comprise cell membrane piercing protrusions 24, extending from a surface of cell handling region 22. The device may include means, such as a pump for inducing flow through the flow system. As fluid flow is forced through the piercing protrusions 24, cells are ruptured. Cell debris may be filtered off using a filter microfabricated in the flow system downstream from the cell lysis means. The cell lysis region may also comprise sharp edged particles, e.g., fabricated from silicon, trapped within the cell handling region. In addition, the cell lysis means may comprise a region of restricted cross-sectional dimension, which implements cell lysis upon application of sufficient flow pressure. In another embodiment, the cell lysis means may comprise a cell lysing agent.

The devices may include a mesoscale detection region microfabricated in the mesoscale flow system, in fluid communication with a cell lysis region, comprising binding moieties capable of binding to a selected intracellular molecular component in the cell sample. Binding moieties may be introduced into the detection region via an inlet port in fluid communication with the detection region. Alternatively, binding moieties may be immobilized in the detection region either by physical absorption onto the channel surfaces, or by covalent attachment to the channel surfaces, or to solid phase reactant such as a polymeric bead. Techniques available in the art may be utilized for the chemical activation of silaceous surfaces, and the subsequent attachment of a binding moiety to the surfaces. (See, e.g., Haller in: *Solid Phase Biochemistry*, W. H. Scouten, Ed., John Wiley, New York, pp 535–597 (1983); and Mandenius et al., *Anal. Biochem.*, 137:106–114(1984), and *Anal. Biochem.*, 170:68–72 (1988)).

The binding moiety in the detection region may comprise, e.g., an antigen binding protein, a DNA probe, or one of a ligand/receptor pair, to enable the detection of a preselected cellular, intracellular, or other analyte, such as an antigen, a polynucleotide or a cell surface molecule. The binding assays available in the art which may be utilized in the detection region include immunoassays, enzymatic assays, ligand/binder assays and DNA hybridization assays. The detection of a particular intracellular analyte may be implemented by the selection of an appropriate binding moiety in detection region. The detection region may be fabricated according to methods disclosed in U.S. Ser. No. 07/877,702 filed May 1, 1992, the disclosure of which is incorporated herein by reference.

The mesoscale detection region may also comprise a region sensitive to changes in flow properties induced by the presence of a preselected cellular, intracellular or other analyte in the fluid sample. The flow sensitive region may comprise, e.g., a fractal region, comprising bifurcations leading to plural secondary flow channels. The flow sensitive region, e.g., the fractal region, may be constructed in accordance with the copending related application U.S. Ser. No. 07/877,701, filed May 1, 1992, the disclosure of which is incorporated herein by reference.

Figure 8:
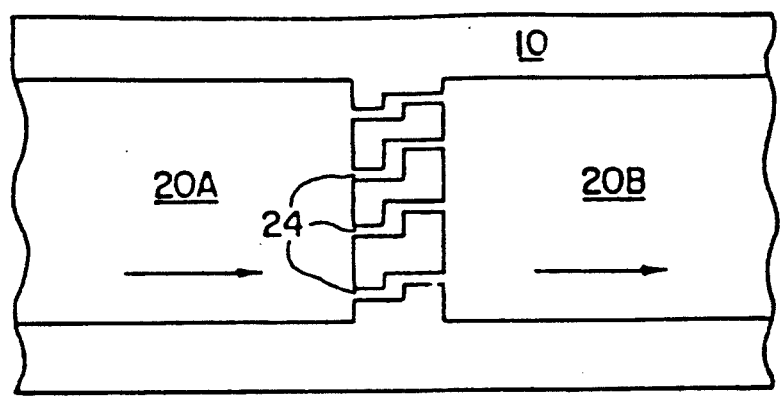
FIGS. 8 through 10 illustrate different embodiments of a filter microfabricated in a mesoscale flow channel 20.
Figure 9:
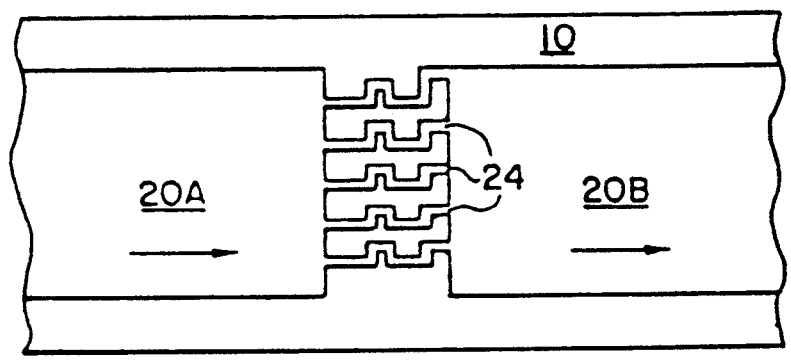
Figure 10:
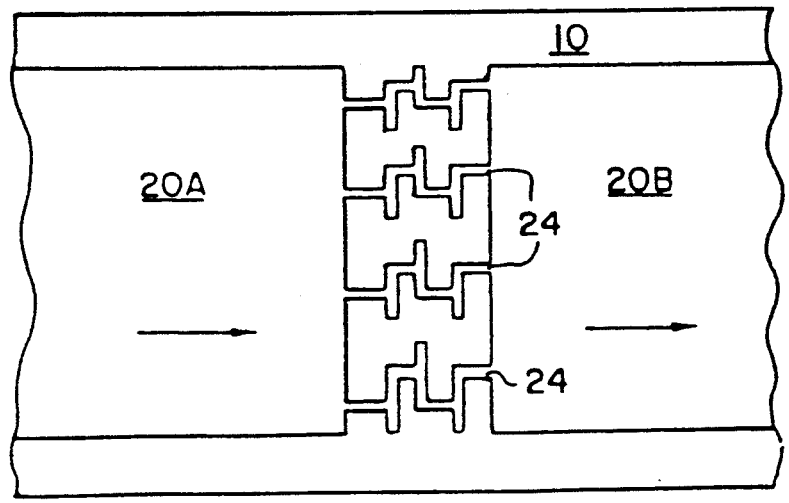

The devices may comprise a plurality of fluid handling regions to enable, e.g., the detection of a preselected intracellular or cell surface moiety in a cell-containing fluid sample. In one embodiment, the mesoscale flow system may be microfabricated with a cell lysis means, a filter for filtering cell debris, and a detection region. The filter may be microfabricated in the flow system between the cell lysis means and the detection region to enable the removal of the lysed cell membrane and other cell debris components from the sample, prior to detection of an intracellular analyte in the detection region. Filters which may be microfabricated in the flow system include the filters 80 shown in FIGS. 8 through 10. In the device 10, shown in FIGS. 8 through 10, the filter 80 is microfabricated between the flow channels 20A and 20B allowing sample fluid in channel 20A to pass through the filter 80. The filtrate exits through the filter 80 into channel 20B, prior to subsequent downstream analysis in, e.g., a mesoscale detection region. Filter 80 is a mesoscale flow channel of reduced diameter in comparison with channel 20, microfabricated with depths and widths on the order of 0.1 to 20 μm. In contrast, the flow channels 20A and 20B have increased widths and depths on the order of a maximum of approximately 500 μm. The smaller diameter of filter 80 allows the filtration of sheared cell membranes and other cell debris from the sample. Other filter means may be utilized, such as the posts 26 extending from a wall of the flow channel 20 shown in FIG. 5.

The presence of an analyte in the detection region can be detected by any of a number of methods including monitoring the pressure or electrical conductivity of sample fluids in selected regions of the flow system in the device, or by optical detection through a transparent cover or a translucent section of the substrate itself, either visually or by machine. The detection of an analyte in the detection region may be implemented as is disclosed in the copending related applications U.S. Ser. No. 07/877,702, filed May 1, 1992, and U.S. Ser. No. 07/877,701, filed May 1, 1992, the disclosures of which are incorporated herein by reference. Devices such as valves, mesoscale pressure sensors, and other mechanical sensors can be fabricated directly on the silicon substrate and can be mass-produced according to established technologies. Angell et al., *Scientific American*, 248:44–55 (1983). Pressure sensors and other detection means also may be provided in an appliance utilized in combination with the device.

In another embodiment, the fluid handling region may comprise a cell capture region for separating a preselected cell population from a cell-containing fluid sample, to enable the downstream analysis of a macromolecule on or within the cells, or of a component in the extracellular fluid. The cell capture region may comprise binding moieties capable of reversibly binding a target cell via a characteristic cell surface molecule such as protein. In one embodiment, the cell capture region may be utilized to isolate a preselected cell population from a cell containing fluid sample. In this embodiment, the device is provided with means for inducing flow of the sample through the flow system, such as a pump. At a low flow pressure, the cells bind to the binding moieties in the cell capture region. Flow is then continued to wash the cells, e.g., with a flow of buffer. At higher flow rates and pressures, the washed cells are released from the separation region and move downstream for analysis in, e.g., a mesoscale detection region. In another embodiment, the cells remain immobilized while extracellular fluid fluid flows downstream and is analyzed in, e.g., a mesoscale detection region. The bound cells may also be removed from the cell capture region by flowing a specific solvent through the flow system, capable of desorbing the cells from the wall of the cell capture region.

The binding moiety, capable of binding the cells in the cell capture region, e.g., via a cell surface molecule, may be immobilized on the surface of the mesoscale flow channels by physical absorption onto the channel surfaces, or by chemical activation of the surface and subsequent attachment of biomolecules to the activated surface. Techniques available in the art may be utilized for the chemical activation of silaceous channel surfaces, and for the subsequent attachment of a binding moiety to the surfaces. (See, e.g., Haller in: *Solid Phase Biochemistry*, W. H. Scouten, Ed., John Wiley, New York, pp. 535–597 (1983); and Mandenius et al., *Anal. Biochem.*, 137:106–114 (1984), and *Anal. Biochem.*, 170:68–72 (1988)). The binding moiety may be provided within the cell capture region of the mesoscale flow system, as disclosed in U.S. Ser. No. 07/877,702, filed May 1, 1992, the disclosure of which is incorporated herein by reference. The capture of a particular cell type can be implemented by selecting the appropriate binding moiety.

Figure 5:
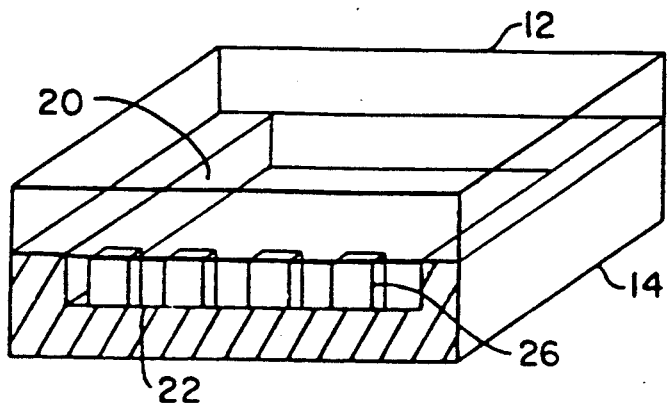
FIG. 5 is a cross sectional perspective view of a fluid handling region 22 on the inert substrate 14 with cell or debris filtering protrusions 26 extending from the wall of the flow channel.

As illustrated in FIG. 5, the cell handling region 22 may comprise protrusions 26 constituting a cellular sieve for separating cells by size. As cell samples are flowed, typically under low pressure, through the flow channel, only cells capable of passing between the protrusions 26 are permitted to flow through in the flow channel.

Figure 2:
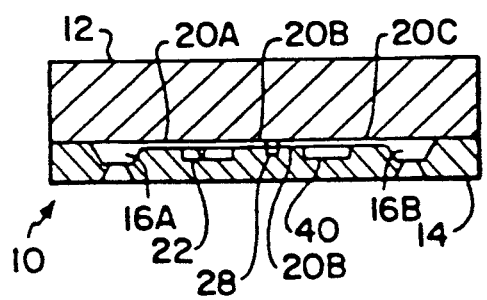
FIG. 2 is a longitudinal cross sectional view of the device shown in FIG. 1.
Figure 3:
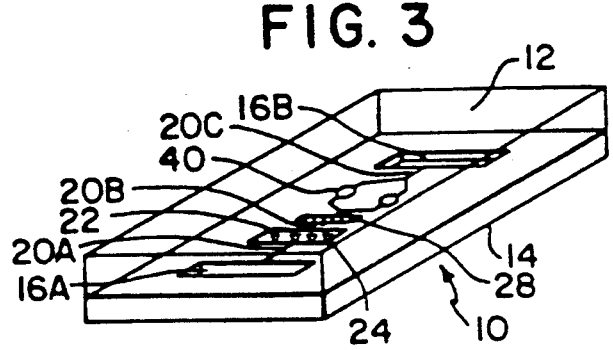
FIG. 3 is a perspective view of the device of FIG. 1.

The devices may comprise several different cell handling regions in the mesoscale flow system of one device. In one embodiment, illustrated schematically in FIGS. 1, 2 and 3, the device 10 may include a silicon substrate 14 microfabricated with a mesoscale flow channel 20, cell lysis chamber 22, and the fractal detection region 40. The device may be utilized to detect the presence of a preselected intracellular component of a cell sample. The cell lysis chamber 22 is provided with cell membrane piercing protrusions 24. Sample fluid may be added to the flow system through inlet 16A. A pump in the device then may be used to force a cell sample through flow channel 20A to the cell lysis chamber 22. The lysed cell sample is then filtered through filter 28 and flows through the fractal detection region 40 towards port 16B. The substrate 14 is covered with a glass or plastic window 12. The presence of an intracellular analyte is indicated by the detection, e.g., optically, of flow restriction in the fractal detection region 40, induced by the particular intracellular analyte. The fractal region may include binding moieties, capable of binding to the analyte, to enhance flow restriction in the fractal region 40.

Figure 4:
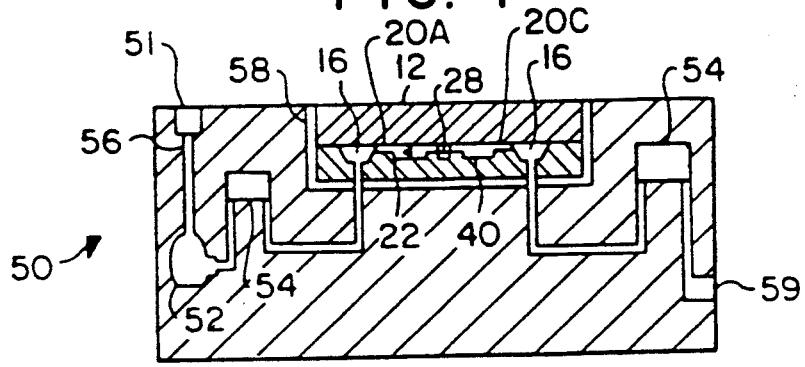
FIG. 4 is a schematic illustration of analytical device 10 nested within appliance 50, which is used to support the device 10 and to regulate and detect the pressure of sample fluids in device 10.

The analytical devices containing the mesoscale flow system can be used in combination with an appliance for delivering and receiving fluids to and from the devices, such as appliance 50, shown schematically in FIG. 4, which incorporates a nesting site 58 for holding the device 10, and for registering ports, e.g., ports 16 on the device 10, with a flow line 56 in the appliance. The appliance may include means, such as a pump, for forcing the cell containing sample into a cell lysis means to cause cell lysis upon application of sufficient flow pressure. After a cell containing fluid sample suspected to contain a particular cellular analyte is applied to the inlet port 51 of the appliance, pump 52 is actuated to force the sample through the flow system 20 of device 10. Alternatively, depending on the analytical device in use, the sample may be injected into the device, or may enter the flow system simply by capillary action. In one embodiment, the flow systems of the devices may be filled to a hydraulically full volume and the appliance may be utilized to direct fluid flow through the flow system.

The analytical devices also may be utilized in combination with an appliance for viewing the contents of the mesoscale channels in the devices. The appliance in one embodiment may comprise a microscope for viewing the contents of the mesoscale channels in the devices. In another embodiment, a camera may be included in the appliance, as illustrated in the appliance 60 shown schematically in FIGS. 11 and 12. The appliance 60 is provided with a housing 62, a viewing screen 64 and a slot 66 for inserting a chip into the appliance. As shown in cross section in FIG. 12, the appliance 60 also includes a video camera 68, an optical system 70, and a tilt mechanism 72, for holding device 10, and allowing the placement and angle of device 10 to be adjusted manually. The optical system 70 may include a lens system for magnifying the channel contents as well as a light source. The video camera 68 and screen 64 allow analyte induced changes in sample fluid properties, such as flow properties or color, to be monitored visually, and optionally recorded using the appliance.

The devices of the invention may be utilized to implement a variety of automated, sensitive and rapid analyses of a fluid sample. The device may be fabricated with a series of fluid handling regions in one flow system to enable the rapid efficient multistep analysis of a fluid cell containing sample on a microvolume scale. The devices may also include two or more separated flow systems, e.g., with a common inlet port, wherein one flow system is adapted as a control, such that data obtained during an analysis can be compared with data from the control flow system. A range of analyses thus may be implemented in one device.

In one embodiment, the device of the invention may comprise three or more inlet ports and a branching flow channel in fluid communication with the ports. The device may be provided with valves, e.g., in the appliance, for opening and closing the ports, to control the flow of fluid through the flow system. As illustrated in the device 10, shown schematically in FIG. 7, ports 16A, 16B, 16C and 16D may be independently opened or closed, by means of valves in, e.g., an appliance used in combination with the device, to allow fluid in the flow system to be directed, e.g., out via port 16 or, alternatively, to the fractal detection region 40 and port 16D.

The invention will be understood further from the following nonlimiting examples.

EXAMPLE 1

A channel containing a barrier 26 with 7 $\mu$m gaps (illustrated in cross section in FIG. 5) is filled with HTF-BSA medium and a semen sample applied at the entry hole. The progression of the sperm through the barrier serves as an indicator of sperm motility, and is compared with a control sample.

EXAMPLE 2

Figure 7:
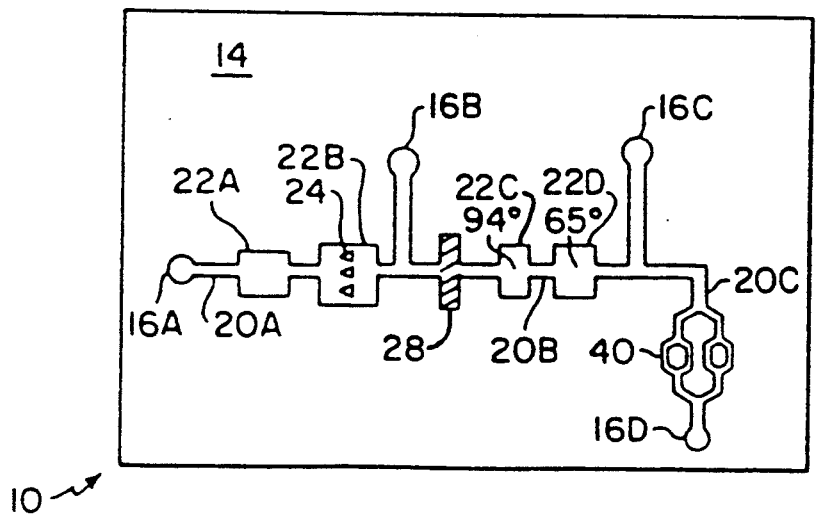
FIG. 7 is a schematic top view of an analytical device 10 fabricated with a series of mesoscale chambers suitable for implementing a variety of functions including cell sorting, cell lysing and PCR analysis.

FIG. 7 depicts schematically a device 10 including substrate 14 used to separate and detect a nucleic acid from a subpopulation of cells in a mixture in a biological fluid sample. Microfabricated on device 10 is a mesoscale flow path 20 which includes a cell separation chamber 22A, a cell lysis chamber 22B, a filter region 28, a polymerase chain reaction (PCR) chamber comprising sections 22C and 22D, and a fractal detection region 40. The mesoscale flow system 20 is also provided with fluid entry/exit ports 16A, 16B, 16C and 16D. The device is used in combination with an appliance, such as appliance 50, shown in FIG. 4. The appliance is provided with fluid paths mated to ports 16 in the device, and valves allowing the ports 16 to be mechanically closed and opened. The appliance also includes pump 52 for regulating the flow of sample fluid through the device. The appliance further includes means for heating the PCR reaction chamber sections 22C and 22D in the device.

Initially, valves in the appliance are used to close ports 16C and 16D, while ports 16A and 16B are open. A sample containing a mixture of cells is directed to the sample inlet port 16A by the pump 52 in the appliance, and flows through the mesoscale flow path 20 to separation chamber 22A. Chamber 22A contains binding moieties immobilized on the wall of the chamber which selectively bind to a surface molecule on a desired type of cell in the sample. Remaining cellular components exit the substrate via port 16B. After binding of the desired cell population in chamber 22A, flow with buffer is continued, to wash and assure isolation of the cell population. Next port 16B is closed and 16C is opened. Flow is then increased sufficiently to dislodge the immobilized cells. Flow is continued, forcing cells through membrane piercing protrusions 24 in chamber 22B, which tear open the cells releasing intracellular material.

Sample flow continues past filter 28, which filters off large cellular membrane components and other debris, to mesoscale PCR chamber section 22C, which is connected to PCR chamber section 22D by flow channel 20B. Taq polymerase, primers and other reagents required for the PCR assay next are added to section 22D through port 16C from a mated port and flow path in the appliance, permitting mixing of the intracellular soluble components from the separated subpopulation of cells and the PCR reagents. With port 16A closed, a pump in the appliance connected via port 16B is used to cycle the PCR sample and reagents through flow channel 20B between sections 22C and 22D, set at 94° C. and 65° C. respectively, to implement plural polynucleotide melting and polymerization cycles, allowing the amplification of product polynucleotide. The mesoscale PCR analysis is performed in accordance with methods disclosed in U.S. Ser. No. 07/877,662, filed May 1, 1992, Mesoscale Polynucleotide Amplification Analysis, the disclosure of which is hereby incorporated herein by reference.

The valves in the appliance next are used to close port 16C and to open port 16D. The pump in the appliance connected to port 16B is then used to direct the amplified polynucleotide isolated from the cell population to the fractal detection region 40. Flow restriction in the fractal region 40 serves as a positive indicator of the presence of amplified polynucleotide product and is detected optically through a glass cover disposed over the detection region.

It will be understood that the above descriptions are made by way of illustration, and that the invention may take other forms within the spirit of the structures and methods described herein. Variations and modifications will occur to those skilled in the art, and all such variations and modifications are considered to be part of the invention, as defined in the claims.

What is claimed is:

1. A device for analyzing a fluid, cell-containing sample, the device comprising:
   a solid substrate microfabricated to define:
      a sample inlet port; and
      a mesoscale flow system comprising:
         a sample flow channel extending from said inlet port; and
         a cell handling region for treating cells disposed in fluid communication with said flow channel, said cell handling region comprising a cell lysing structure; and
   means for detecting an analyte in a fluid sample in said flow system.

2. The device of claim 1 further comprising means for inducing flow of cells in a sample through said mesoscale flow channel and said cell handling region to force cells in said sample into contact with said cell lysing structure, thereby to lyse cells in said sample.

3. The device of claim 1 wherein said cell lysing structure comprises a portion of a flow channel having cell membrane piercing protrusions extending from a wall thereof.

4. The device of claim 1 wherein said cell lysing structure comprises sharp edged particles trapped within said cell handling region; and
   wherein said device further comprises means for inducing flow to force cells in said sample into contact with said sharp edged particles, thereby to lyse said cells.

5. The device of claim 1 wherein said cell lysing structure comprises a region of restricted cross-sectional dimension sufficient to permit passage of intracellular molecules while prohibiting passage of cells.

6. The device of claim 1 wherein said means for detecting comprises means downstream of said cell lysing structure for detecting the presence of an intracellular molecular component of a cell in said sample.

7. The device of claim 1 further comprising means disposed downstream of said cell lysing structure for collecting insoluble cellular debris.

8. The device of claim 1 further comprising a filter means disposed downstream of said cell lysing structure.

9. The device of claim 1, wherein said substrate comprises microfabricated silicon.

10. A device for analyzing a fluid, cell-containing sample, the device comprising:
    a solid substrate microfabricated to define:
       a sample inlet port; and
       a mesoscale flow system comprising:
          a sample flow channel extending from said inlet port; and
          a cell handling region for treating cells disposed in fluid communication with said flow channel, said cell handling region comprising a cell capture region comprising immobilized binding sites which reversibly bind a preselected cell surface molecule of a cell population in a cell-containing fluid sample; and
    means for inducing flow of cells in said sample through said mesoscale flow channel and said cell handling region;
    wherein said means for inducing flow of said cell-containing sample is used to induce flow:
       at a first flow rate sufficiently slow to permit capture of cells in said cell population by said binding sites, thereby to separate said cell population from said sample; and
       at a second flow rate, higher than said first flow rate, and sufficient to release said separated cells from said capture region; and
    wherein said device further comprises means for detecting an analyte in a fluid sample in said flow system.

11. The device of claim 10 wherein said detecting means comprises means downstream of said cell capture region for determining the presence of an extracellular component of said sample.

12. The device of claim 10 wherein said flow system further comprises:
    cell lysing means downstream from said cell capture region and wherein said flow inducing means includes means for forcing cells into said cell lysing means, thereby to lyse cells in said sample; and
    wherein said detecting means comprises means for detecting the presence of an intracellular component in said captured cells.

13. The device of claim 12 further comprising filter means, disposed between said cell-lysing means and said detection means, for filtering cellular debris from said sample.

14. The device of claim 13 further comprising a sump for collecting insoluble debris disposed adjacent said filter.

15. A device for analyzing a fluid, cell-containing sample, the device comprising:
- a solid substrate microfabricated to define:
  - a sample inlet port; and
  - a mesoscale flow system comprising:
    - a sample flow channel extending from said inlet port; and
    - a cell handling region for treating cells disposed in fluid communication with said flow channel, said cell handling structure defining:
      - a cell sieve comprising means defining a plurality of flow passages of restricted size allowing only cells of a sufficiently small diameter to pass therethrough; and
      - a cell lysing structure;
- means for inducing flow of cells in a sample through said mesoscale flow channel and said cell handling structure; and
- means for detecting an analyte in a fluid sample in said flow system.

16. The device of claim 2, 10 or 15 further comprising an appliance for use in combination with said substrate, said appliance comprising:
- means for holding said substrate; and
- fluid input means interfitting with an inlet port on said substrate; and
- wherein said means for inducing flow comprises pump means, disposed in said appliance, for passing fluid through the flow system of said substrate when it is held in said housing means.

17. The device of claim 1, 10 or 15, wherein said means for detecting comprises an appliance for use in combination with said substrate, said appliance comprising:
- means for holding said substrate; and
- optical means for viewing the contents of said mesoscale flow system in said substrate.

18. The device of claim 17, wherein said optical means comprises magnifying optics and a video camera, and wherein said appliance further comprises:
- a tilt mechanism for manually adjusting the angle and location of the device; and
- a video screen for viewing the contents of said flow system.

19. The device of claim 2, 10 or 15, wherein said:
- a solid substrate microfabricated to define:
  - a sample inlet port;
  - a mesoscale flow system further comprises:
    - a branching channel in fluid communication with said flow channel; and
    - at least two additional ports communicating between said flow channel and said branching channel, respectively, and the exterior of said flow system; and
- wherein said device further comprises valve means for directing flow through said flow system to a selected one of said additional ports.

20. The device of claim 19 wherein said detecting means comprises a detection region within said mesoscale flow system for optically or electrically gathering data indicative of the presence or concentration of an analyte in a sample contained within said flow system.

21. The device of claim 19 further comprising an appliance for use in combination with said substrate, said appliance comprising:
- means for holding said substrate;
- fluid flow channels interfitting with at least two of said ports when said substrate is held in said holding means; and
- wherein said means for inducing flow comprises pump means disposed within said appliance in fluid communication with said inlet ports for inducing flow within said flow system.

22. The device of claim 21 wherein said valve means is disposed within said appliance.

23. A device for analyzing a cell-containing fluid sample, the device comprising:
- a solid substrate microfabricated to define:
  - a mesoscale cell handling structure; and
  - at least two mesoscale flow systems, each of which comprise a flow channel and an analyte detection region, one of said flow systems being adapted to analyze a sample, the other being adapted as a control, and said flow systems being in fluid communication with said cell handling structure; and
- means for inducing flow of a sample through said cell handling structure and then through both said flow systems, thereby to permit comparison of data from the detection regions of said systems.

24. The device of claim 1, 10, 15 or 23 wherein, within at least a portion of a channel in a said flow system, the channel width and channel depth each are between 0.1 $\mu$m and 500 $\mu$m.

25. The device of claim 24 wherein the channel width in said portion is between 2.0 and 500 $\mu$m.

26. The device of claim 24 wherein the channel depth in said portion is between 0.1 and 100 $\mu$m.

* * * * *

UNITED STATES PATENT AND TRADEMARK OFFICE
CERTIFICATE OF CORRECTION

PATENT NO. : 5,304,487
DATED : April 19, 1994
INVENTOR(S) : Wilding et al.

It is certified that error appears in the above-indentified patent and that said Letters Patent is hereby corrected as shown below:

In column 13, line 13, after "handling", the word reading "region" should read --structure--.

In column 13, line 35, after "held in said", the word reading "housing" should read --holding--.

In column 13, lines 50-52, after "wherein said", the words reading ": a solid substrate microfabricated to define: a sample inlet port;" should be deleted.

In column 14, line 1, before "mesoscale flow" the word "a" should be deleted.

Signed and Sealed this

Twentieth Day of September, 1994

*Attest:*

BRUCE LEHMAN

*Attesting Officer*       *Commissioner of Patents and Trademarks*